United States Patent
Donatti et al.

(10) Patent No.: US 6,991,180 B1
(45) Date of Patent: Jan. 31, 2006

(54) MULTI-COMPONENT INTERNAL MIX SPRAY APPLICATOR

(75) Inventors: Joseph T. Donatti, Howell, MI (US); Kenneth W. Shaner, Howell, MI (US); Andrew P. Mellentine, Owosso, MI (US); Ian S. Williams, Howell, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/711,753

(22) Filed: Oct. 1, 2004

(51) Int. Cl.
*B05B 9/00* (2006.01)

(52) U.S. Cl. ............... 239/124; 239/416.1; 239/417.5; 239/304; 239/112; 222/135

(58) Field of Classification Search ............... 239/407, 239/412, 413, 416.1, 417.5, 303, 304, 305, 239/106, 112, 124, 127, 104, 581.1; 222/135, 222/144.5, 318
See application file for complete search history.

(56) References Cited

U.S. PATENT DOCUMENTS

| | | | | |
|---|---|---|---|---|
| 3,135,467 A | * | 6/1964 | Greenman | ............ 239/304 |
| 4,113,182 A | * | 9/1978 | Brago | ............ 239/304 |
| 4,163,523 A | * | 8/1979 | Vincent | ............ 239/305 |
| 4,948,042 A | * | 8/1990 | Tench et al. | ............ 239/113 |
| 5,080,283 A | | 1/1992 | Kukesh et al. | |
| 5,170,939 A | * | 12/1992 | Martin | ............ 239/112 |
| 5,299,740 A | | 4/1994 | Bert | |
| 5,351,892 A | * | 10/1994 | Conte | ............ 239/304 |
| 5,405,083 A | | 4/1995 | Moses | |
| 5,484,107 A | | 1/1996 | Holmes | |
| 5,549,246 A | | 8/1996 | Kukesh | |
| 5,678,764 A | | 10/1997 | Kukesh | |
| 5,732,885 A | | 3/1998 | Huffman | |
| 5,829,679 A | | 11/1998 | Strong | |
| 6,193,110 B1 | | 2/2001 | Crebbe | |

* cited by examiner

Primary Examiner—David A. Scherbel
Assistant Examiner—Seth Barney
(74) Attorney, Agent, or Firm—Brooks Kushman P.C.

(57) ABSTRACT

A spray applicator for dispensing a multiple component reactant mixture and for also dispensing purge materials. The applicator has a valve plate with a plurality of valve seats for cylindrical valve elements that are arcuately shifted by a control air circuit.

14 Claims, 2 Drawing Sheets

MULTI-COMPONENT INTERNAL MIX SPRAY APPLICATOR

BACKGROUND OF THE INVENTION

1. Field of the Invention

The present invention relates to a spray applicator for spraying reactant mixtures, such as polyurethane mixtures of polyol and isocyanate that may also be combined with coloring agents and other additives. The spray applicator also includes fluid ports for flushing and purging reactant mixtures from the applicator.

2. Background Art

Spray polyurethane processes are currently being developed for spray forming articles of manufacture, such as interior trim assemblies for vehicles. Polyurethane is normally formed by mixing polyol and isocyanate in a spray gun or applicator mix head. Polyol and isocyanate react relatively quickly to form polyurethane and, therefore, must be mixed just prior to dispensing or they may react and clog the spray gun or applicator mix head. Polyurethane is generally off-white, black, or gray in color. In many applications, it would be advantageous to provide a desired color in the polyurethane that is used to spray form articles of manufacture. This may be true even if the article has a pigmented in-mold coating that covers the exterior of the spray formed article.

Products formed by polyurethane spray forming processes can benefit from supplying additives to the polyol and isocyanate mixture. Examples of additives that increase the utility of polyurethane spray foam products include blowing agents for forming foam polyurethane, color concentrates for coloring the finished product, and cell opener polyol compounds that can soften the polyurethane.

Spray form polyurethane can be used to form a durable exterior surface skin layer and also form a polyurethane foam layer that may form a foam backing for a polyurethane skin. A blowing agent or cell opening polyol may be combined with polyol and isocyanate to form a foam layer behind a skin layer that can be used to form a covered padded portion of an interior trim assembly. Prior systems for forming a padded polyurethane portion of an interior trim component requires two separate spray applicators or spray guns. One spray applicator would be used to form the polyurethane skin, while a second spray applicator would be used to form the polyurethane foam layer. Either applicator could be provided with a colorant additive that mixes color with the polyol prior to being provided to the spray applicator. Use of multiple spray applicators increases the process time and material waste due to the need to more frequently flush the spray applicators with solvent to purge reactant materials from the spray applicator. Changing from one spray applicator to another requires added processing time and reduces productivity.

It would be beneficial to develop a system and apparatus for a spray forming polyurethane process wherein different additives may be added selectively at different points in the spray forming process. It would also be advantageous to provide a spray forming head that can selectively provide additives that may color, condition or foam the polyurethane in predetermined portions of a spray formed article.

There is also a need for a spray applicator having built-in solvent flush and air purge ports that can be used to readily and rapidly clear any constituents used to form the polyurethane article from the spray applicator.

The above problems and short-comings of the prior art are addressed by applicants' invention as summarized below.

SUMMARY OF THE INVENTION

According to one aspect of the present invention, a spray applicator for spraying a reaction mixture is provided. The spray applicator comprises a dispensing head connected to a plurality of sources that contain a material to be dispensed and a control fluid circuit. The dispensing head also has a mixing chamber and an outlet through which the reactant mixture may be dispensed. A valve plate is disposed in the dispensing head and includes a plurality of supply channels that are in fluid flow communication with one of the material sources. Each of the channels has a valve seat. A plurality of rotatable valve elements are each disposed in one of the valve seats. A first group of the valve elements have a material dispensing port that has a dispensing position and a recirculating position. At least one of a second group of valve elements have a dispensing position and a shut off position. All of the valve elements have a first control fluid port and a second fluid port that is operatively connected to a fluid control circuit. The control fluid circuit is connected to each of the valve elements for selectively pressurizing either the first port or the second port to arcuately shift one or more of the valve elements. The first plurality of valve elements may be shifted between the dispensing position and the recirculating position in which the components of the mixture may be recirculated. The second group of valve elements may be arcuately shifted between a dispensing position and a shut off position. When either type of valve element is in its dispensing position, it dispenses its associated material to the mixing chamber and then to the outlet of the spray applicator.

According to other aspects of the spray applicator of the present invention, the first group of valve elements may be used to dispense one material that is to be deposited by the spray applicator. This group of valve elements may dispense isocyanate or polyol. The spray applicator can also be used to spray (in combination with the isocyanate and polyol) colorants, texture modifiers and foam forming blowing agents. The second group of valve elements may be used to dispense components that do not require recirculation, such as solvents or purge air. The spray applicator head may be controlled by a pneumatic fluid circuit that uses compressed air to selectively shift the valve elements. The valve elements are arcuately shifted in a reciprocal manner depending upon whether the first or second port of a given valve element is pressurized by the fluid circuit.

According to another aspect of the invention, rotatable valve elements comprising cylindrical members disposed in a tubular sleeve are provided. The tubular sleeve is affixed to the valve plate, while the rotatable valve element may be selectively arcuately rotated within the sleeve by the control fluid. The control fluid selectively pressurizes the first or second port of one or more valve elements to cause selected ones of either the first plurality of valve elements or the second group of valve elements to dispense the material into the mixing chamber of the spray applicator. A first plurality of valve elements may each dispose one of a polyol component, an isocyanate component, a colorant component, or a texture modifying component. The second plurality of valve elements may be used to each dispense one of a solvent and/or compressed air to clean and purge a spray applicator of the reactant mixture components and additives.

According to another aspect of the present invention, a spray applicator for spraying a reaction mixture is provided. The spray applicator comprises a dispensing head in fluid flow communication with a plurality of material sources that each contain a material to be dispensed. The dispensing head has a mixing chamber and an outlet. A valve plate is disposed in the dispensing head and has a plurality of channels. Each of the material sources is in fluid flow communication with at least one of the channels. A plurality of valve elements are provided. A first group of the valve elements is used to dispense one material to be deposited by the spray applicator. The first group of valve elements each have a material dispensing port that has a dispensing position and a recirculating position. A first one of the first group of valve elements dispenses isocyanate, a second one of the first group of valve elements dispenses polyol, a third one of the first group of valve elements dispenses a colorant, and a fourth one of the first group of valve elements dispenses a texture modifier. A second group of the valve elements dispenses purge material into the mixing chamber in a dispensing position. The second group of valve elements also has a shutoff position. A first one of the second group of valve elements dispenses a solvent, and a second one of the second group of valve elements dispenses compressed air, or another gas. A pneumatic control fluid circuit is operatively connected to each of the valve elements that selectively pressurizes either a first port or a second port of each valve element to arcuately shift one or more of the first group of valve elements between the dispensing position and the recirculating position and to arcuately shift the second group of valve elements between the dispensing position and the shutoff position. When the valve elements are in their dispensing position the material is dispensed into the mixing chamber and to the outlet.

These and other aspects of the present invention will be better understood in view of the attached drawings and following detailed description of the invention.

DETAILED DESCRIPTION OF THE PREFERRED EMBODIMENT(S)

Figure 1:
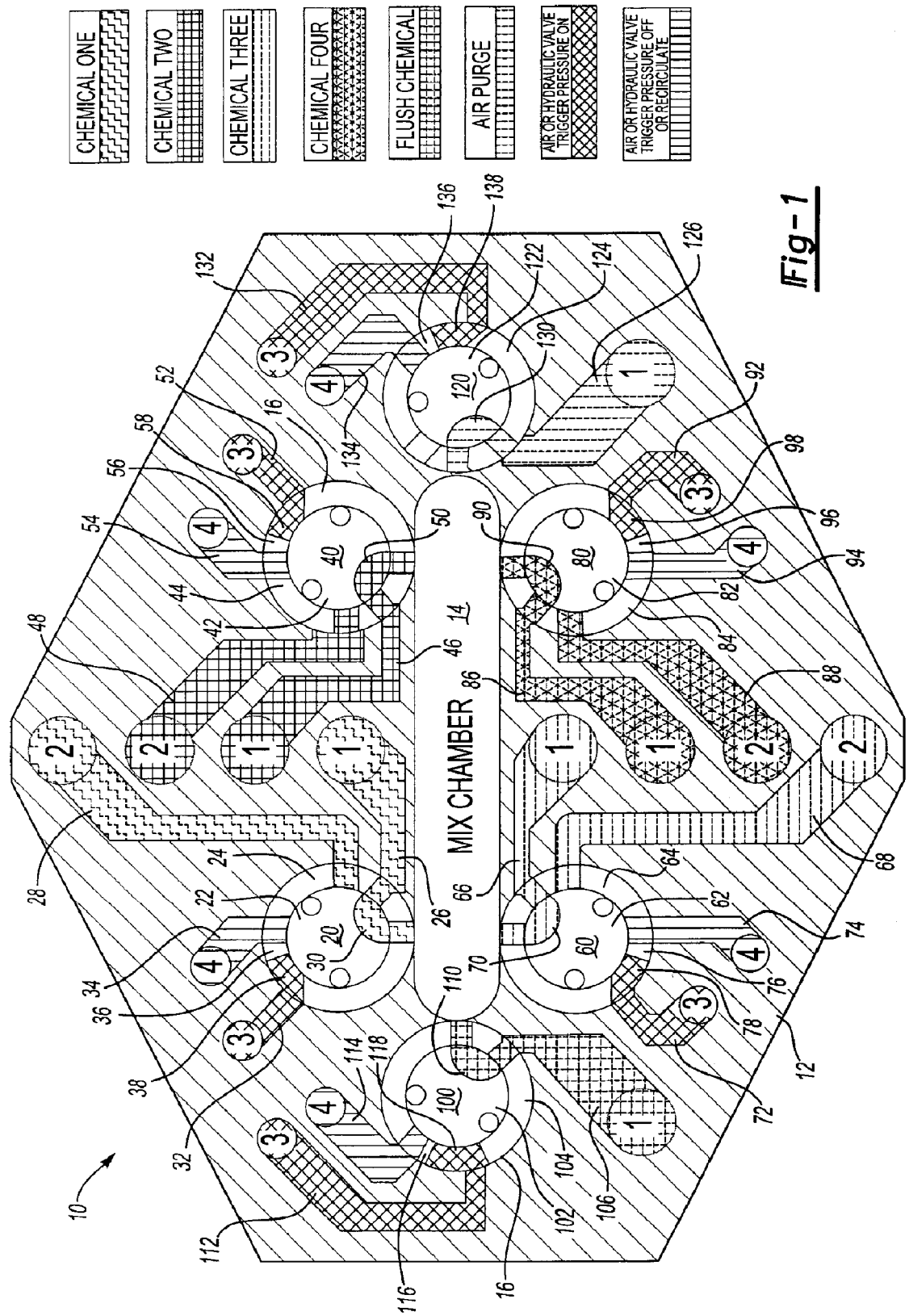
FIG. 1 is a schematic cross-sectional view showing a valve plate that is adapted to dispense four different constituents of a reactant mixture and that also includes a chemical flush and air purge valves. The reacting components, solvent flush, and air purge valves are controlled by a pressurized control fluid circuit.

Referring to FIG. 1, a spray applicator 10 is shown schematically with particular reference to a valve plate 12. The valve plate defines or is in fluid flow communication with a mix chamber 14 in which constituents of a reactant mixture combine and which also receive a solvent flush and air purge. As used herein, "air purge" should be understood to include the use of gases other than air. Reactant chemicals, solvent flush and air purge streams are each selectively controlled by a pneumatic controller. It should be understood that an air or hydraulic control system could be used in stead of a pneumatic controller in accordance with the invention. To facilitate an understanding of the invention, different deposit materials, the flush chemical, air purge, pressure on and pressure off ports are represented by different cross hatch patterns in FIG. 1.

As shown in FIG. 1 six valve seats 16 are shown in the valve plate 12. It should be understood that depending upon the requirements of a particular application more or fewer valve seats could be provided depending upon the number of chemicals to be combined and requirements for solvent flush and air purge.

Chemical one in the disclosed embodiment is a polyol component of a polyurethane reactant mixture and is controlled by a polyol valve element 20. The polyol valve element 20 includes a cylindrical portion 22 and a tubular sleeve 24. The cylindrical portion 22 is arcuately movable within the tubular sleeve 24. An inlet channel 26 supplies polyol to the valve element 20. A recirculating channel 28 is provided to permit polyol to be recirculated if it is not being dispensed through the valve element 20. A switching passage 30 directs the polyol from the inlet channel 26 to the mix chamber 14 when it is in the position shown in FIG. 1.

A dispensing control air port 32 is supplied with control air under pressure when the controller signals that the polyol valve element should be opened to allow polyol to be dispensed into the mix chamber 14. A recirculating control air port 34 is provided with control air under pressure to shift an actuator 36 that extends from the cylindrical portion 22 into a groove 38 formed in the tubular sleeve 24. When control air is ported to the recirculating control air port 34 the actuator 36 shifts in a counterclockwise direction relative to the position shown in FIG. 1, causing the switching passage 30 to direct polyol from the inlet channel 26 to the recirculating channel 28.

Chemical two in the disclosed embodiment is an isocyanate component of a polyurethane reactant mixture and is controlled by an isocyanate valve element 40. The isocyanate valve element 40 includes a cylindrical portion 42 and a tubular sleeve 44. The cylindrical portion 42 is arcuately movable within the tubular sleeve 44. An inlet channel 46 supplies isocyanate to the valve element 40. A recirculating channel 48 is provided to permit isocyanate to be recirculated if it is not being dispensed through the valve element 40. A switching passage 50 directs the isocyanate from the inlet channel 46 to the mix chamber 14 when it is in the position shown in FIG. 1.

A dispensing control air port 52 is supplied with control air under pressure when the controller signals that the isocyanate valve element should be opened to allow isocyanate to be dispensed into the mix chamber 14. A recirculating control air port 54 is provided with control air under pressure to shift an actuator 56 that extends from the cylindrical portion 42 into a groove 58 formed in the tubular sleeve 44. When control air is ported to the recirculating control air port 54 the actuator 56 shifts in a counterclockwise direction, relative to the position shown in FIG. 1, causing the switching passage 50 to direct isocyanate from the inlet channel 46 to the recirculating channel 48.

Chemical three in the disclosed embodiment is a colorant component for the a polyurethane reactant mixture and is controlled by a colorant valve element 60. The colorant valve element 60 includes a cylindrical portion 62 and a tubular sleeve 64. The cylindrical portion 62 is arcuately movable within the tubular sleeve 64. An inlet channel 66 supplies colorant to the valve element 60. A recirculating channel 68 is provided to permit colorant to be recirculated if it is not being dispensed through the valve element 60. A switching passage 70 directs the colorant from the inlet channel 66 to the mix chamber 14 when it is in the position shown in FIG. 1.

A dispensing control air port 72 is supplied with control air under pressure when the controller signals that the colorant valve element should be opened to allow colorant to be dispensed into the mix chamber 14. A recirculating control air port 74 is provided with control air under pressure to shift an actuator 76 that extends from the cylindrical portion 62 into a groove 78 formed in the tubular sleeve 64. When control air is ported to the recirculating control air port 74 the actuator 76 shifts in a counterclockwise direction, relative to the position shown in FIG. 1, causing the switching passage 30 to direct colorant from the inlet channel 66 to the recirculating channel 68.

Chemical four in the disclosed embodiment is a texture modifying component for a polyurethane reactant mixture and is controlled by a texture modifying valve element 80. The texture modifying valve element 80 includes a cylindrical portion 82 and a tubular sleeve 84. The cylindrical portion 82 is arcuately movable within the tubular sleeve 84. An inlet channel 86 supplies texture modifying to the valve element 80. A recirculating channel 88 is provided to permit texture modifying to be recirculated if it is not being dispensed through the valve element 80. A switching passage 90 directs the texture modifying from the inlet channel 86 to the mix chamber 14 when it is in the position shown in FIG. 1.

A dispensing control air port 92 is supplied with control air under pressure when the controller signals that the texture modifying valve element should be opened to allow texture modifying to be dispensed into the mix chamber 14. A recirculating control air port 94 is provided with control air under pressure to shift an actuator 96 that extends from the cylindrical portion 82 into a groove 98 formed in the tubular sleeve 84. When control air is ported to the recirculating control air port 94 the actuator 96 shifts in a counterclockwise direction, relative to the position shown in FIG. 1, causing the switching passage 90 to direct texture modifying from the inlet channel 86 to the recirculating channel 88.

Chemical five in the disclosed embodiment is a solvent flush for a polyurethane reactant mixture and is controlled by a solvent flush valve element 100. The solvent flush valve element 100 includes a cylindrical portion 102 and a tubular sleeve 104. The cylindrical portion 102 is arcuately movable within the tubular sleeve 104. An inlet channel 106 supplies solvent to the valve element 100. A switching passage 110 directs the solvent from the inlet channel 106 to the mix chamber 14 when it is in the position shown in FIG. 1.

A dispensing control air port 112 is supplied with control air under pressure when the controller signals that the solvent flush valve element should be opened to allow solvent to be dispensed into the mix chamber 14. A shut-off control air port 114 is provided with control air under pressure to shift an actuator 116 that extends from the cylindrical portion 102 into a groove 118 formed in the tubular sleeve 104. When control air is ported to the shut-off control air port 114 the actuator 116 shifts in a counterclockwise direction, relative to the position shown in FIG. 1, causing the switching passage 110 to stop the flow of solvent from the inlet channel 106.

Chemical six in the disclosed embodiment is a compressed air purge that is controlled by a air purge valve element 120. The air purge valve element 120 includes a cylindrical portion 122 and a tubular sleeve 124. The cylindrical portion 122 is arcuately movable within the tubular sleeve 124. An inlet channel 126 supplies solvent to the valve element 120. A switching passage 130 directs the solvent from the inlet channel 126 to the mix chamber 14 when it is in the position shown in FIG. 1.

A dispensing control air port 132 is supplied with control air under pressure when the controller signals that the air purge valve element should be opened to allow compressed air to be dispensed into the mix chamber 14. A shut-off control air port 134 is provided with control air under pressure to shift an actuator 136 that extends from the cylindrical portion 122 into a groove 138 formed in the tubular sleeve 124. When control air is ported to the shut-off control air port 134 the actuator 136 shifts in a counterclockwise direction, as shown in FIG. 1, causing the switching passage 130 to stop the flow of compressed air from the inlet channel 126.

Figure 2:
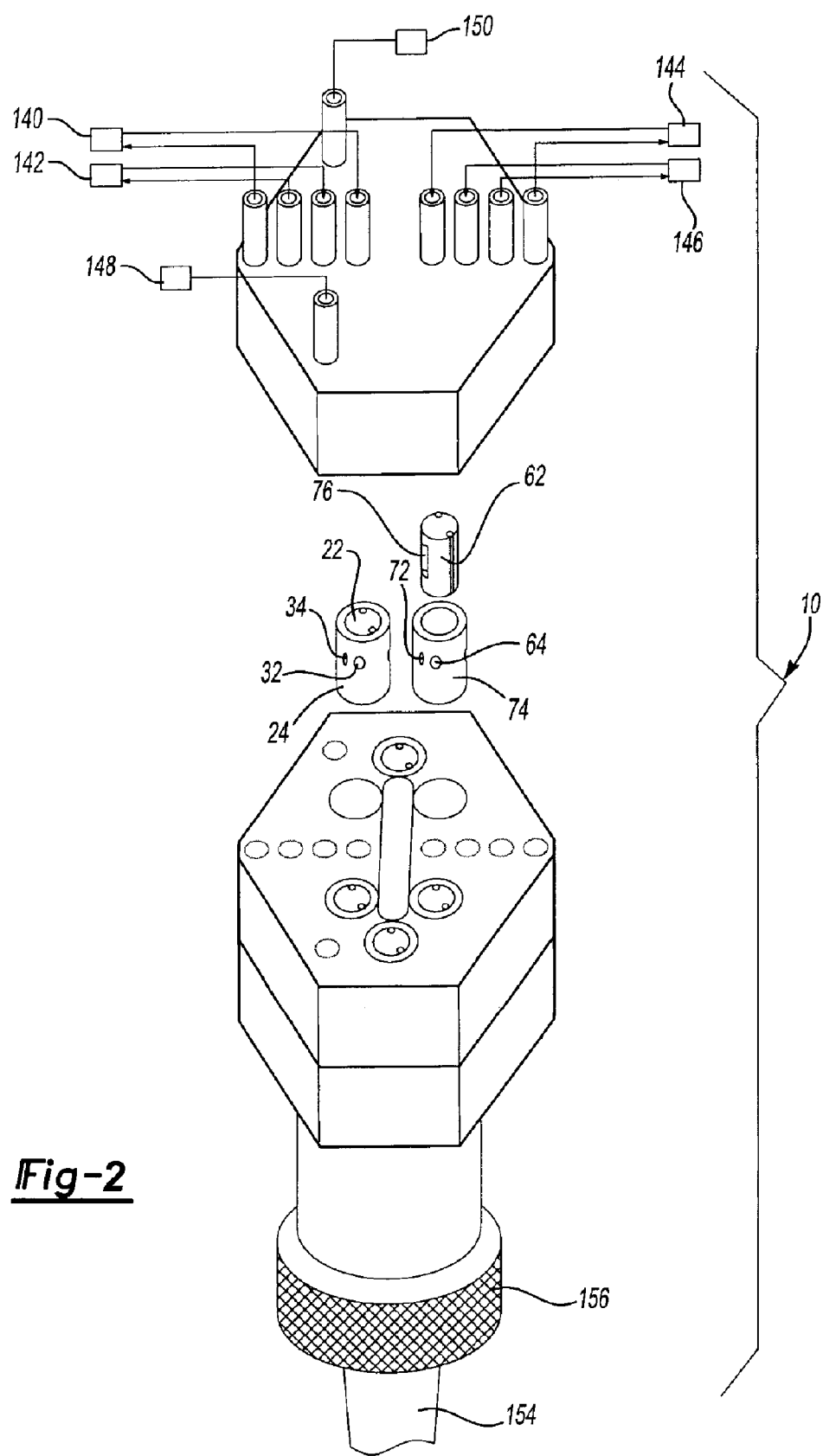
FIG. 2 is a schematic exploded perspective view of a spray applicator made according to the present invention.

Referring to FIG. 2, the construction of the spray applicator 10 is shown in a partially exploded view but without showing the control air porting for simplicity. Sources, or tanks, of materials are shown schematically to include a polyol source 140, an isocyanate source 142, a colorant source 144, and a blowing agent, or texture modifying, source 146. The clean-out or purge materials are also represented schematically as solvent source 148 and compressed gas, or air, source 150. The materials dispensed are provided to a dispensing nozzle 154 that may be secured to the applicator 10 by a locking ring 156.

The cylindrical portion 22 of the tubular sleeve 22 is shown as it is assembled together with the dispensing control air port 32 and the recirculating control air port 34 visible from the side of the tubular sleeve 24. The cylindrical portion 62 is shown exploded away from the tubular sleeve 74 with the actuator 76 visible from the side of the cylindrical portion 62. The dispensing control air port 72 and the recirculating control air port 74 visible from the side of the tubular sleeve 64.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A spray applicator for spraying a reaction mixture, comprising:

a dispensing head in fluid flow communication with a plurality of material sources that each contain a material to be dispensed and having a control fluid circuit, the dispensing head having a mixing chamber and an outlet;

a valve plate disposed in the dispensing head, the valve plate having a plurality of channels, wherein each of the material sources is in fluid flow communication with a supply channel, each of the supply channels having a valve seat;

a plurality of rotatable valve elements, wherein one of the valve elements is disposed in each of the valve seats, a first group of the valve elements having a material dispensing port that has a dispensing position in which material is dispensed into the mixing chamber and a recirculating position in which material is recirculated, at least one of a second group of the valve elements having a dispensing position in which material is dispensed into the mixing chamber and a shutoff position; and that is operatively connected to the control fluid circuit at a first port and a second port; and wherein the control fluid circuit is connected to a plurality of actuators, wherein each of the valve elements has one actuator port and a second port, the control fluid circuit selectively pressurizes either the first port or the second port to arcuately shift one or more of the first plurality of valve elements between the dispensing position and the recirculating position and to arcuately shift the second group between the dispensing position and the shutoff position, wherein when the valve elements are in their dispensing position the material in the one material source to which its associated supply channel is connected is provided to the mixing chamber and then to the outlet.

2. The spray applicator of claim 1 wherein the first group of valve elements are used to dispense materials to be deposited by the spray applicator.

3. The spray applicator of claim 1 wherein a first one of the first group of valve elements dispenses isocyanate and a second one of the first group of valve elements dispenses polyol.

4. The spray applicator of claim 1 wherein one of the first group of valve elements dispenses a colorant.

5. The spray applicator of claim 1 wherein one of the first group of valve elements dispenses a texture modifier.

6. The spray applicator of claim 1 wherein the second group of valve elements dispenses a purge material.

7. The spray applicator of claim 1 wherein one of the second group of valve elements dispenses a solvent.

8. The spray applicator of claim 1 wherein one of the second group of valve elements dispenses compressed air.

9. The spray applicator of claim 1 wherein the control fluid circuit is a pneumatic fluid circuit.

10. The spray applicator of claim 1 wherein the rotatable valve elements each further comprise a cylindrical member disposed in a tubular sleeve, the tubular sleeve being affixed to the valve plate and the rotatable valve elements being arcuately rotated within the sleeves by the control fluid selectively pressurizing the first port or the second port of one or more of the valve elements to cause selected ones of either the first group of valve elements or the second group of valve elements to dispense material into the mixing chamber.

11. The spray applicator of claim 10 wherein the first group of valve elements each dispense one of a polyol component, an isocyanate component, a colorant component, and a texture modifying component.

12. The spray applicator of claim 10 wherein the second plurality of valve elements each dispense one of a solvent and a compressed gas.

13. A spray applicator for spraying a reaction mixture, comprising:
  a dispensing head in fluid flow communication with a plurality of material sources each containing a material to be dispensed, the dispensing head having a mixing chamber and an outlet;
  a valve plate disposed in the dispensing head, the valve plate having a plurality of channels, wherein each of the material sources is in fluid flow communication with at least one of the channels;
  a plurality of valve elements, wherein a first group of the valve elements used to dispense one material to be deposited by the spray applicator, the first group of valve elements each having a material dispensing port that has a dispensing position and a recirculating position, wherein a first one of the first group of valve elements dispenses isocyanate, a second one of the first group of valve elements dispenses polyol, a third one of the first group of valve elements dispenses a colorant, and a fourth one of the first group of valve elements dispenses a texture modifier, and wherein a second group of the valve elements dispenses one material into the mixing chamber, the second roup of valve elements having a dispensing position and a shutoff position, wherein a first one of the second group of valve elements dispenses a solvent, and a second one of the second group of valve elements dispenses compressed air; and
  a pneumatic control fluid circuit operatively connected to each of the valve elements that selectively pressurizes either a first port or a second port of each valve element to arcuately shift one or more of the first group of valve elements between the dispensing position and the recirculating position and to arcuately shift the second group of valve elements between the dispensing position and the shutoff position, wherein when the valve elements are in their dispensing position the material is dispensed into the mixing chamber and to the outlet.

14. The spray applicator of claim 13 wherein the valve elements each have a cylindrical member and a tubular sleeve, the tubular sleeve being affixed to the valve plate and the cylindrical member being arcuately rotated within the sleeve by the control fluid that selectively pressures the first port or the second port of one or more of the valve elements to cause selected ones of either the first plurality of valve elements or the second group of valve elements to dispense the material that is provided to the valve elements by the channel in which the valve elements are disposed.

* * * * *